United States Patent [19]

Mukai

[11] Patent Number: 5,176,052
[45] Date of Patent: Jan. 5, 1993

[54] MULTI SPINDLE AUTOMATIC LATHE
[75] Inventor: Yuuichi Mukai, Hiroshima, Japan
[73] Assignee: Mitsubishi Jukogyo Kabushiki Kaisha, Tokyo, Japan
[21] Appl. No.: 618,254
[22] Filed: Nov. 27, 1990
[30] Foreign Application Priority Data Dec. 20, 1989 [JP] Japan .................. 1-328314
Jul. 27, 1990 [JP] Japan .................. 2-197795

[51] Int. Cl.⁵ .................................... B23B 3/34
[52] U.S. Cl. ........................... 82/129; 29/38 B
[58] Field of Search .......... 82/129, 158, 160, 132–134, 82/137, 138, 141, 161; 29/37 R, 38 B

[56] References Cited

U.S. PATENT DOCUMENTS

| | | | |
|---|---|---|---|
| 3,245,290 | 4/1966 | Johansson | 82/129 |
| 3,404,589 | 10/1968 | Brown et al. | 82/3 |
| 3,685,111 | 8/1972 | Nemoto | 82/129 X |
| 3,744,355 | 7/1973 | Flisch | 82/129 |
| 3,945,752 | 3/1976 | Bennett | 82/158 X |
| 4,292,865 | 10/1981 | Liu et al. | 82/36 R |

FOREIGN PATENT DOCUMENTS

| | | | |
|---|---|---|---|
| 0113997 | 7/1984 | European Pat. Off. | |
| 0242870 | 10/1987 | European Pat. Off. | |
| 2907664 | 9/1979 | Fed. Rep. of Germany | 82/129 |
| 0212447 | 8/1984 | German Democratic Rep. | 82/129 |
| 0248299 | 8/1987 | German Democratic Rep. | 82/129 |
| 1070728 | 6/1967 | United Kingdom | 82/129 |
| 8400909 | 3/1984 | World Int. Prop. O. | |

Primary Examiner—Paula A. Bradley
Assistant Examiner—J. Daulton
Attorney, Agent, or Firm—Jacobson, Price, Holman & Stern

[57] ABSTRACT

A multi-spindle automatic lathe (11) includes a spindle carrier (12) mounted freely rotatable in an indexing fashion relative to a head stock (13), a plurality of workpieces (W) supported in spindles (14) on the head stock and freely rotatably driven on the same circumference, a plurality of tool slides (15) and integral tool holders positioned around the spindle carrier (12), one tool slide and integral tool holder being provided for each of the spindles and arranged on the head stock (13) so that each tool (27) mounted on each tool holder (25) is; freely reciprocable in dual directions, one direction parallel with the axis of the spindle and the other direction normal to that axis, for processing a workpiece.

4 Claims, 4 Drawing Sheets

MULTI SPINDLE AUTOMATIC LATHE

BACKGROUND OF THE INVENTION

The present invention relates to a multi-spindle automatic lathe adapted to continuously process a plurality of workpieces while rotating them in an indexing fashion, and more particularly to such a lathe for the purpose of improving the processing efficiency and reducing the overall dimensions of the lathe.

In a continuous processing operation for rod-shaped workpieces where a plurality of tools is exchanged consecutively, a multi spindle automatic lathe has been used, wherein the lathe comprises a spindle carrier mounted so as to be freely rotatable in an indexing fashion relative to a head stock, and a plurality of spindles each of which is mounted to be freely rotatable about the indexing rotation center of the spindle carrier and has a workpiece loaded thereon respectively.

Each workpiece is loaded on the respective spindle of the multi-spindle lathe and is processed simultaneously at each of the work stations provided corresponding in number to the number of spindles. Upon the processing operation for a workpiece being completed at each of the stations, the spindle carrier is rotated in an indexing fashion so that each workpiece may be processed sequentially at a plurality of work stations.

The construction of such multi spindle automatic lathes in the prior art will be described in detail hereinbelow, with reference to FIG. 4 which illustrates the concept of such automatic lathe, and FIG. 5 which illustrates its spindle carrier in a cut-away view.

Illustrated in these drawings are a head stock 101 for the multi-spindle automatic lathe and a spindle carrier 102 which is mounted to be freely rotatable in an indexing fashion relative to head stock 101. A driving shaft 105 extends through the center of the spindle carrier 102 via bearings 106 to be freely rotatable relative to the head stock 101 and the spindle carrier 102. The above-described driving shaft 105 is coupled with a driving motor (not shown) via a reduction gear 104 which is incorporated in a column 103.

The above-described spindle carrier 102 is provided with a plurality of hollow spindles 107 each of which surrounds and is arranged to be parallel with the driving shaft 105.

A spacing between the driving shaft 105 and each of spindles 107 is designed to be equal with a spacing between each of adjacent spindles 107, and the rotary indexing angle of the spindle carrier 102 for every run is designed to correspond with the number of the spindles 107 to be mounted on the spindle carriers 102.

Fixed at the rear end of the driving shaft 105 is a driving gear 109 which may simultaneously engage a follower gear 108 fixed at the rear end of each of the spindles 107, and all of the spindles 107 are made to be rotatable in the same direction as the driving shaft 105 is driven to rotate.

Additionally, a circular rod-like workpiece W which penetrates through each of the spindles 107 and has its distal portion to be processed extended beyond the tip end of the spindle 107, is supported in position on the spindle 107 by means of a collet 110 attached to the spindle 107 respectively.

In each of the work stations in number corresponding to the number of the spindles 107 to be attached, there is arranged a cross tool slide 111 movable in a direction (i.e., in a upper and downward direction in FIG. 4) in which it may intersect with the driving shaft 105, and an end tool slide 112 shiftable in a direction parallel with the driving shaft 105 (i.e., in a lateral direction in FIG. 4), these slides 111 and 112 being selectively arranged in accordance with the feeding direction of the processing tool 113 loaded on these slides for the lathe turning operation.

The cross tool slide 111 is attached to the side of the head stock 101, whereas the end tool slide 112 is attached to the side of the column 103 towards which the head stock 101 faces.

The processing tools 113, 113' loaded on these tool slides are used in the lathe-turning, milling, drilling and thread-forming operations and the like to be performed on the workpieces, and a cutter 113' is shown loaded on the end tool slide 111 in the illustrated embodiment, whereas a rotary tool 113 such as a drill and the like is shown loaded on the end tool slide 112.

In the multi-spindle automatic lathe constituted as above, a workpiece W is previously contained on a stock reel 114 provided in the rearward (in the leftward direction in FIG. 4) of the multi-spindle automatic lathe, and then the workpiece W is caused to penetrate through the spindle 107 freely rotatably attached on the spindle carrier 102 and projects into a tooling zone 115 defined between the head stock 101 and the column 103. The workpiece W is subject to various machining operations whenever the spindle carrier 102 makes a rotary indexing movement.

In the traditional multi-spindle automatic lathe of the type as described and illustrated in FIGS. 4 and 5, while the cross tool slide 111 movable in the direction in which it may intersect with the axis of the spindle 107 is mounted on the side of the head stock, the end tool slide 112 shiftable in a direction in parallel with the axis of the spindle 107 is arranged at the side of column 103 facing head stock 101 with the tooling zone sandwiched therebetween.

Consequently, an operator had to frequently access the multi-spindle automatic lathe from its front or back portions to replace the processing tool 113 when required to load or unload the processing tool 113 relative to each of the tool slides 111 and 112. This produces a problem significantly reducing operating efficiency.

Moreover, because a separate feed driving mechanism is provided for each of the tool slides 111 and 112 independently on head stock 101 and column 103, there was another problem that the entire lathe was enlarged in dimensions. Furthermore each of the tool slides 111 and 112 can merely move in a single direction with a result that the processing freedom of the lathe was limited.

Thus, for the multi-spindle automatic lathe having a plurality of spindles which are parallel each other, it has been desirable that each of the tool slides and a feed driving mechanism which affords a feeding movement to the tool slides are designed to be compact as much as possible in order to facilitate exchanging the processing tools and ensuring an easy removal of chips.

In particular, a tool slide and its driving mechanism with a compact construction is in desperate need for the traditional multi-spindle automatic lathe, where respective tool slides must be arranged on a plurality of spindles each of which is arranged in an annular configuration, because such a lathe inherently does not allow an ample operating space.

BRIEF SUMMARY OF THE INVENTION

With the above-described problems as a background, it is an object of the present invention to provide a compact multi-spindle automatic lathe which is adapted to process workpieces continuously while rotating them in an indexing fashion, and which can improve on operating efficiency and reduce overall dimensions compared with other lathes.

The multi-spindle automatic lathe in accordance with the present invention comprises a spindle carrier mounted freely rotatable in an indexing fashion relative to a head stock, a plurality of spindles each of which is mounted to be freely rotatable about the indexing center of the spindle carrier and has a workpiece loaded thereon respectively, and a plurality of tool slides each of which is positioned around the spindle carrier in accordance with each of the spindles and arranged on the head stock to be freely reciprocable in dual directions, one direction in parallel with the axis of the spindle and the other direction intersecting the axis of the spindle, the tool slides having a tool loaded on the spindle carrier, respectively, to process the workpieces.

The above-described tool slide comprises a plurality of sliding shafts each of which is mounted on the head stock to be freely reciprocable in a direction parallel with the axis of the spindle, and a plurality of tool holders each of which is attached on a respective distal end of the sliding shaft to be freely reciprocable in a direction at an angle to the spindle, and a tool mounted thereon to process the work.

In accordance with the multi-spindle automatic lathe built as above-described, a plurality of workpieces are supported in position on the spindle of the spindle carrier and rotated together with the spindles, and a plurality of tool slides are arranged on the head stock in such a manner that they surround the spindle carrier and slide in a direction parallel with the axis of each spindle and have tool holders thereon, each being movable in a direction intersecting with the axis of the respective spindle, thereby permitting the processing tool attached on the tool slide to process the work as predetermined.

In accordance with the multi-spindle automatic lathe 15 of the present invention, a plurality of tool holders upon which processing tools are loaded are arranged on the head stock upon which the spindle carrier is attached for supporting a plurality of spindles to be freely rotatable, and these tool holders are shiftable in a direction normal to the axis of the spindle upon which the workpiece is loaded and also in a direction parallel with the axis of the spindle. This arrangement may allow the lathe to provide an increased freedom during the processing operation and permit a complicated processing operation to be carried out easily and at an increased rate, while at the same time ensuring a remarkable reduction in dimensions along with an improved operating efficiency.

BRIEF DESCRIPTION OF THE DRAWINGS

The invention will now be described in detail with reference to the accompanying drawings, wherein.

DETAILED DESCRIPTION OF PREFERRED EMBODIMENTS

Figure 1:
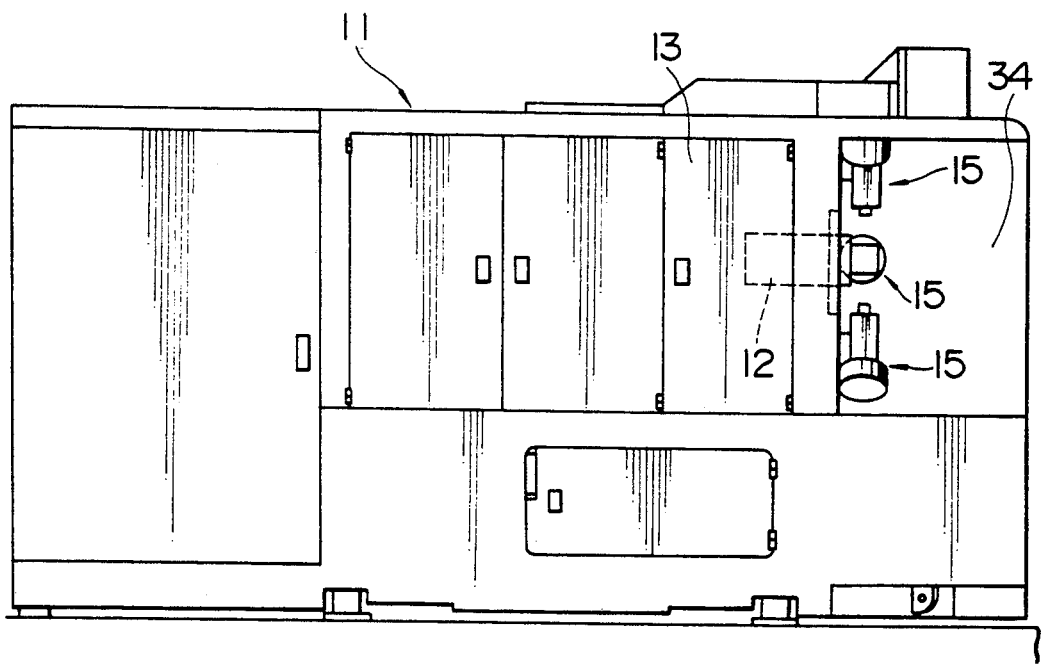
FIG. 1 is a side elevational view illustrating the general configuration of the multi spindle automatic lathe in accordance with one embodiment of the present invention.

The multi-spindle automatic lathe in accordance with the present invention will be described in detail hereinbelow, with reference to FIG. 1 and FIG. 2, wherein one embodiment of the multi-spindle automatic lathe is illustrated as embodied in a six-spindle automatic lathe used to process cylindrical rod-like material. FIG. 1 illustrates a general configuration of the automatic lathe, whereas FIG. 2 illustrates a front configuration of the head stock of the lathe.

Figure 5:
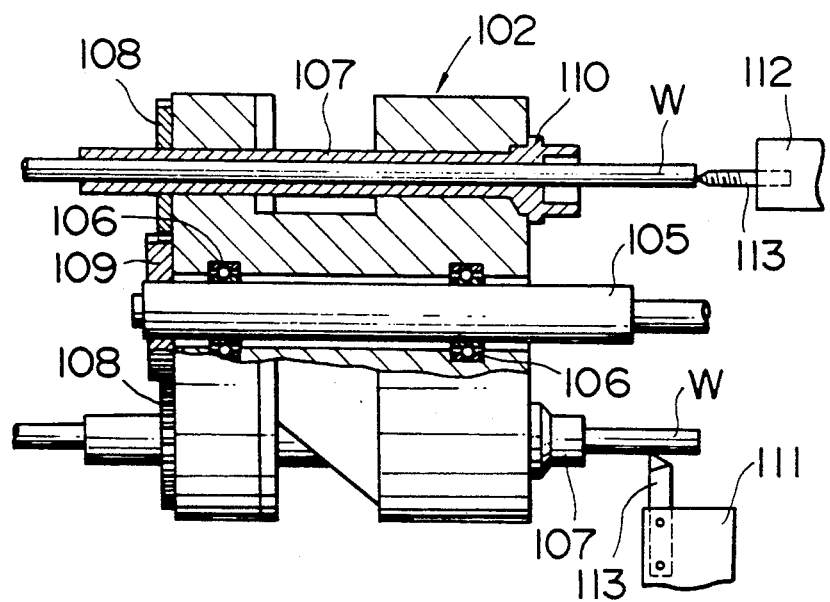
FIG. 5 is a cut-away view illustrating the general construction of a portion of the spindle carrier of the automatic lathe of FIG. 4.

This automatic lathe body 11 is provided at its front portion with the head stock 13 which supports the spindle carrier 12 freely rotatable in an indexing fashion. The above-described spindle carrier is provided with six spindles equally spaced in a circular configuration, each of these spindles being drivably rotatable. A cylindrical rod-shaped workpiece W is held on each of these spindles 14. The essential construction of this spindle carrier is identical with that of the traditional lathe shown in FIG. 5. Arranged around the spindle carrier 12 are six tool slides 15, the number of which is selected depending on the number of spindles 14, and each of which is attached on the head stock 13.

Figure 2:
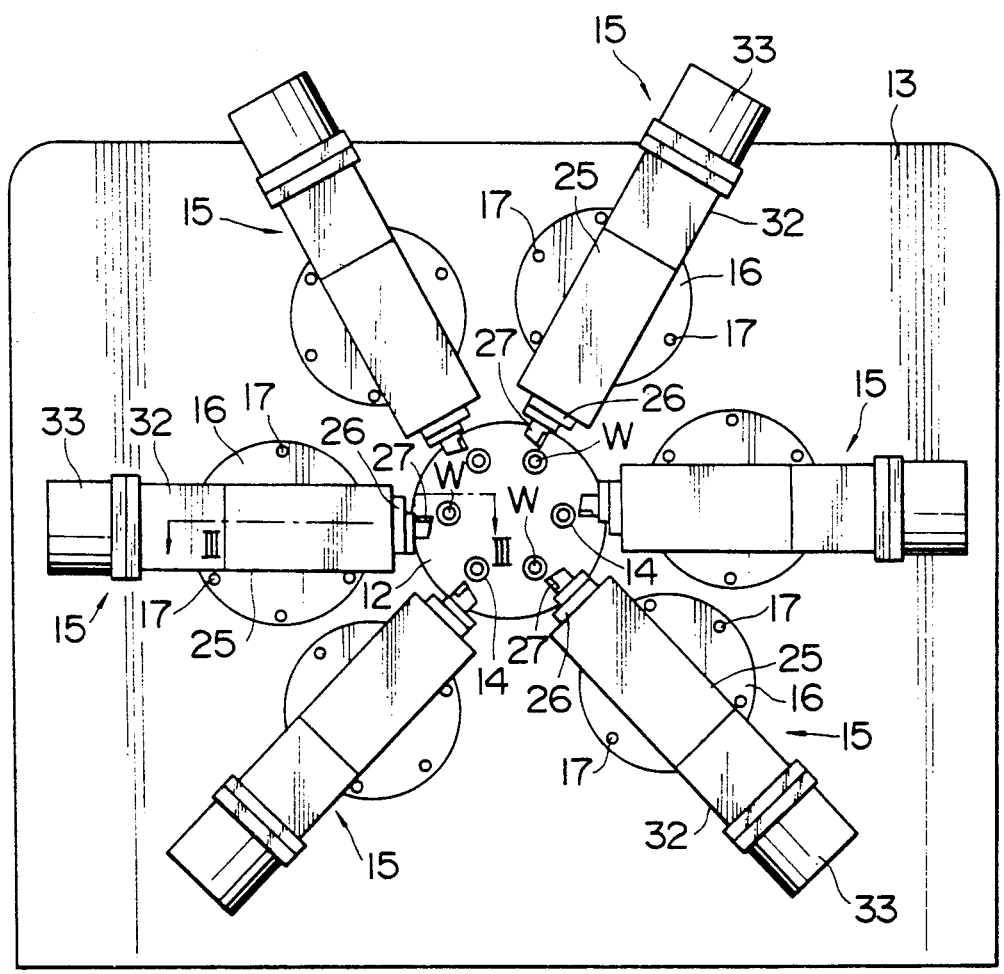
FIG. 2 is a front elevational view of a portion of the head stock of the automatic lathe of FIG. 1.
Figure 3:
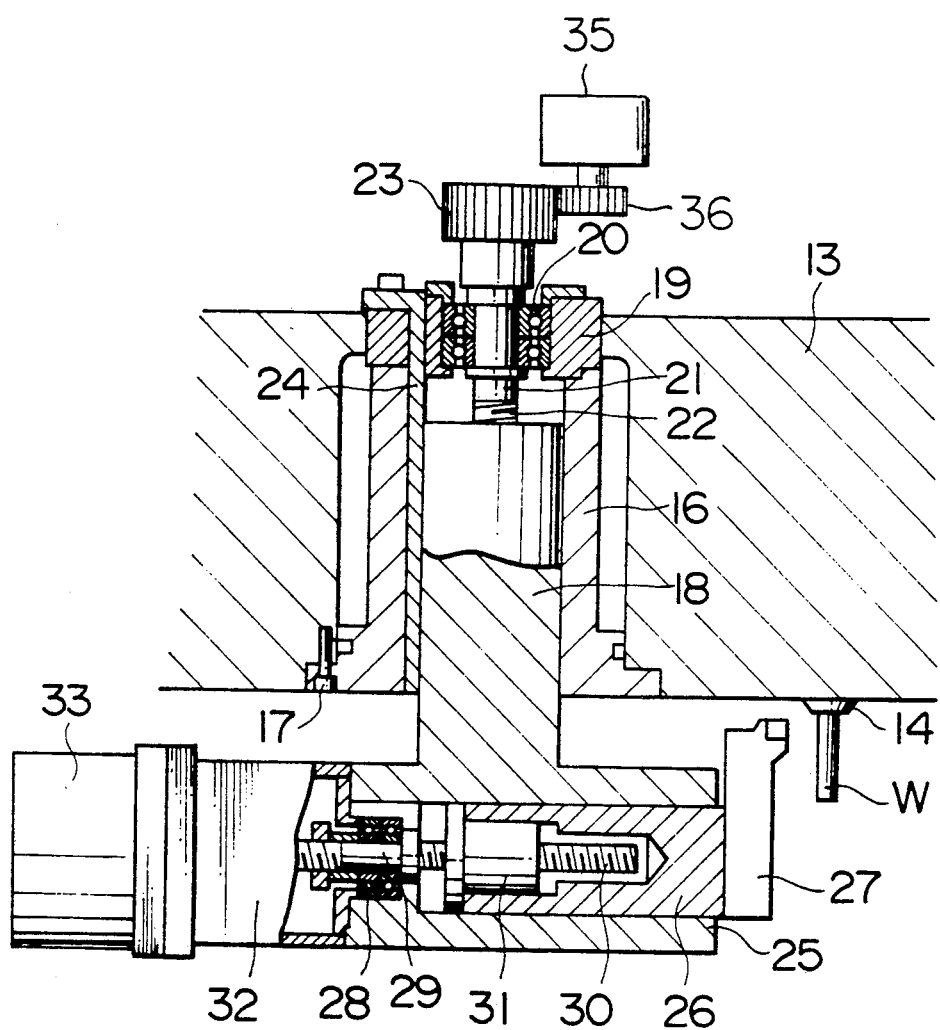
FIG. 3 is a cross-sectional view taken along the line III—III in FIG. 2.

As illustrated in FIG. 2 and FIG. 3, which shows a cross-sectional view taken along the line III—III in FIG. 2, the head stock 13 is arranged around the spindle carrier 12 and is provided with a plurality of sliding guide cylinders 16 arranged in a cylindrical array. Each guide cylinder 16 is fixed in position via bolts 17 respectively. A sliding shaft 18 of rectangular cross-section is freely slidably engaged within a similarly shaped hole in each sliding guide cylinder 16. Threadably engaged with the rear end portion of each sliding shaft positioned in the head stock 13 is the screw thread portion 22 of threaded feed shaft 21 supported in position to be freely rotatable relative to the head stock 13 by means of bearing 20 via a bearing mount 19. By reversibly rotating feed gear 23 provided on the rear end of threaded feed shaft 21 by means of a first feeding drive motor (not shown) via power transmission means (not shown), all sliding shafts 18 may be shifted simultaneously inwardly and outwardly relative to head stock 13, i.e. in the vertical direction in FIG. 3.

In this embodiment, a wedge-like gib 24 is provided in a clearance between the sliding guide cylinder 16 and the sliding shaft 18, the gib 24 serving to adjust the fitting clearance of the sliding shaft 18 relative to the sliding guide cylinder 16.

A rectangular cylindrically-shaped tool holder guide cylinder 25, which extends in a direction normal to the direction in which the sliding shaft slides, is formed at the distal end of sliding shaft 18 integrally with the sliding shaft 18.

A tool holder 26 of rectangular cross-section engages in freely slidable relationship within the working end portion on the spindle 14 side of each tool holder guide cylinder 25, and a processing tool 27, such as a cutter and the like, which performs a predetermined operation against the workpiece W supported on spindle 14, respectively, is exchangeably mounted on the distal portion of each tool holder 26.

When the processing tool 27 used is a rotary tool, such as a drill and the like, it may be more convenient to use a tool holder of the type incorporating a driving motor and couple the rotary tool with the driving motor of the tool holder.

Secured on the proximal, or other, end portion of tool holder 26 positioned in the above-described tool holder guide cylinder 25, is a nut 31 which may threadably engage with a male thread portion 30 formed on the distal end side of the threaded feed shaft 29, which is in turn freely rotatably supported in the tool holder guide cylinder 25 via bearings 28 respectively. Coupled with each of these threaded feed shafts 29 at its proximal end portion is a second feed driving motor 32 attached on the end of tool holder guide cylinder 25 opposite the processing tool 27. By actuating these second feed driving motors 32 to reversibly rotate the threaded shaft 29, the tool holder 26 together with the processing tool 27 is shifted in the lateral directions in FIG. 3, or inwardly and outwardly relative to guide cylinder 25.

In this embodiment, the second feed driving motors 32 are provided with a pulse-corder 33, respectively, to detect a rotary phase and the number of rotations of threaded feed shaft 29, so that a position of the processing tool 27 relative to the workpiece W may be detected.

In accordance with the multi cylinder automatic lathe of the present invention which is constructed as described above, as the spindle carrier 12 rotates in an indexing fashion, each of the workpieces W held on a spindle 14 of the spindle carrier 12 is positioned in a work station which is aligned with a processing tool 27 of a tool slide 15.

The workpiece W is thus drivably rotated together with the spindle 14 by means of driving means (not shown) incorporated in the automatic lathe 11.

By actuating either the first driving feed motor (not shown) of each tool slide 15 or the second feed driving motor 32, the processing tool 27 on the tool holder 26 of tool slide 15 is caused to shift in a direction parallel with the axis of the spindle 14 or in a direction normal to that axis in order to perform a predetermined processing operation on the workpiece W.

Figure 4:
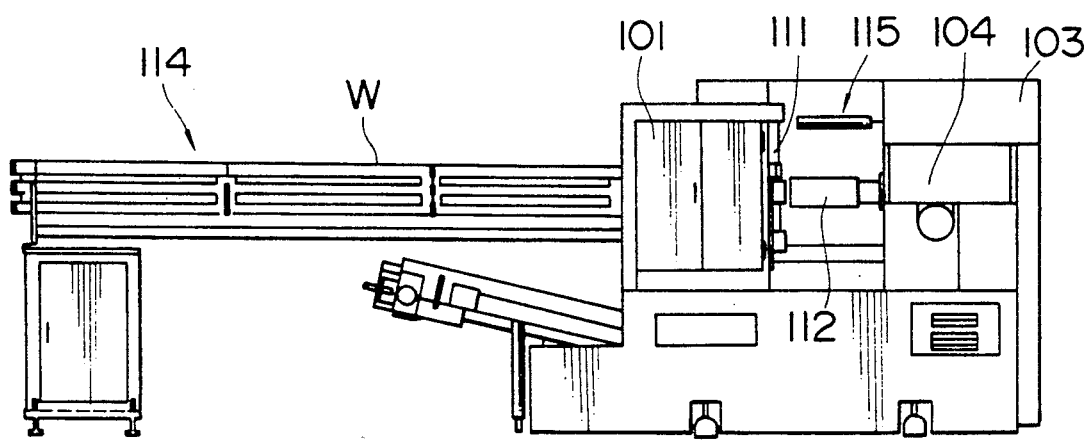
FIG. 4 is a side elevational view illustrating the general construction of a traditional multi spindle automatic lathe.

In this way, the tool holder 26 of each tool slide 15 can be shifted in a dual direction, respectively, and consequently the lathe permits all tool slides 15 to have more freedom during a processing operation than in the traditional device. Moreover, all of these tool slides 15 are arranged at the head stock 13 side, and thus it is possible for the traditional multi-spindle automatic lathe as shown in FIG. 4 to omit the column 103 and the gear box etc., which would otherwise be positioned opposite the head stock, realizing a remarkable reduction in overall dimensions of the lathe. Furthermore, because the column and the gear box etc., do not need to be located in a position opposite the head stock with the tooling zone 34 sandwiched therebetween, the tooling zone and hence the operator's working area can be increased thereby substantially improving the operating efficiency over the prior automatic lathe.

I claim:

1. A multi-spindle automatic lathe comprising:
   a frame;
   a head stock on said frame and having a working face and a back face opposite said working face;
   a spindle carrier mounted on said head stock freely rotatable relative thereto about a spindle carrier axis in an indexing manner;
   a plurality of workpiece holding spindles freely rotatably mounted in substantially circumferentially spaced relationship in said spindle carrier, so that said spindles support respective workpieces adjacent said working face and each rotates individually about its respective spindle axis and all rotate together simultaneously about said spindle carrier axis with said spindle carrier; and
   a plurality of tool carriers mounted on said head stock in substantially circumferentially spaced relationship around said spindle carrier, each tool carrier comprising,
      a tool carrier shaft slidingly mounted in said head stock for reciprocating movement in a direction parallel with said spindle carrier axis, and having a proximal end adjacent said back face and a distal end adjacent said working face,
      a first adjusting shaft rotatably mounted in bearing means on said head stock,
      a screw threaded section on said first adjusting shaft operatively engaging a screw threaded bore in said proximal end of said tool carrier shaft,
      first feeding drive motor means for rotating said first adjusting shaft for moving said tool carrier shaft reciprocally relative to said head stock,
      a tool holder integral with and disposed on the distal end of said tool carrier shaft opposite to said proximal end thereof, comprising,
      a tool holder cylinder in said tool holder having a central axis extending to an angle to the direction of reciprocation of said tool carrier shaft,
      a tool holder shaft slidingly mounted in said tool holder cylinder for reciprocating movement at said angle relative to and in a plane intersecting said spindle carrier axis,
      an outer distal end on said tool holder shaft in the direction of said spindle carrier axis,
      an inner proximal end on the opposite end of said tool holder shaft, and
      a tool removably mounted on said outer distal end of said tool holder shaft for engaging with and machining a workpiece on a respective one of said spindles,
      a second adjusting shaft rotatably mounted in second bearing means mounted in said tool holder,
   a screw threaded section on said second adjusting shaft,
   a screw threaded nut fixed on said inner proximal end of said tool holder shaft and operatively engaging said screw threaded section on said second adjusting shaft, and
   a second feeding drive motor means for rotating said second adjusting shaft for moving said tool holder shaft and said tool thereon reciprocally relative to said workpiece on said respective one of said spindles, so that said first adjusting screw independently adjusts the position of said tool in a direction parallel to said spindle axis of said respective one of said spindles and said second adjusting shaft independently adjusts said tool in a plane extending in a direction intersecting said spindle axis of said respective one of said spindles.

2. The lathe as claimed in claim 1 wherein:

said tool holder cylinder central axis extends perpendicular to said spindle carrier axis.

3. A multi-spindle automatic lathe as claimed in claim 1 and further comprising:
- a tool carrier bore in said head stock for each tool carrier shaft; and
- a sliding guide cylinder removably mounted on said head stock and disposed in each tool carrier bore; each tool carrier shaft being slidably mounted in a respective sliding guide cylinder.

4. A multi-spindle automatic lathe as claimed in claim 3 and further comprising:
- a clearance between each tool carrier shaft and said respective sliding guide cylinder; and
- an adjustable wedge-shaped gib in said clearance for adjusting the fitting clearance between said tool carrier shaft and said respective sliding guide cylinder.

* * * * *